P. PERRY.
Car Coupling.
No. 21,901.
2 Sheets—Sheet 1.
Patented Oct. 26. 1858.
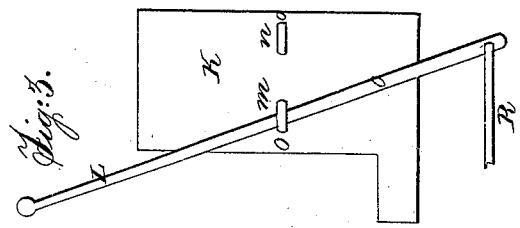
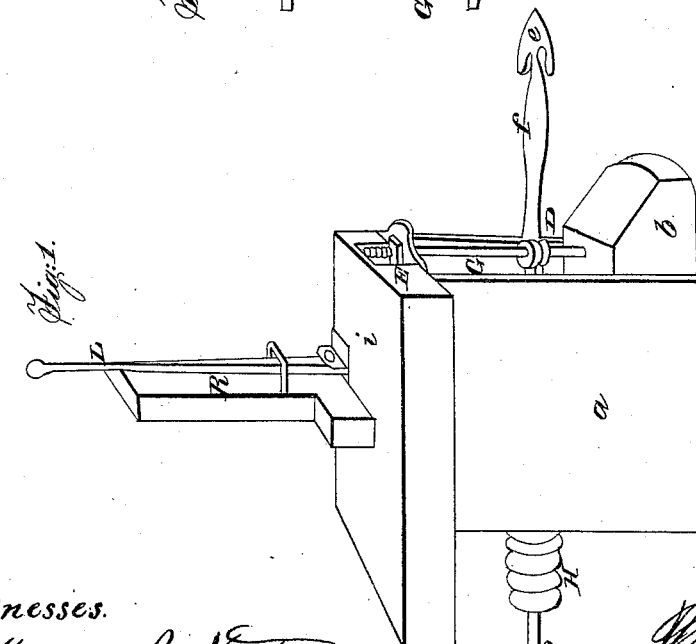
Witnesses.
Marcus P. Norton
Thomas Hardman
Inventor.

P. PERRY.
Car Coupling.
No. 21,901.
2 Sheets—Sheet 2.
Patented Oct. 26, 1858.
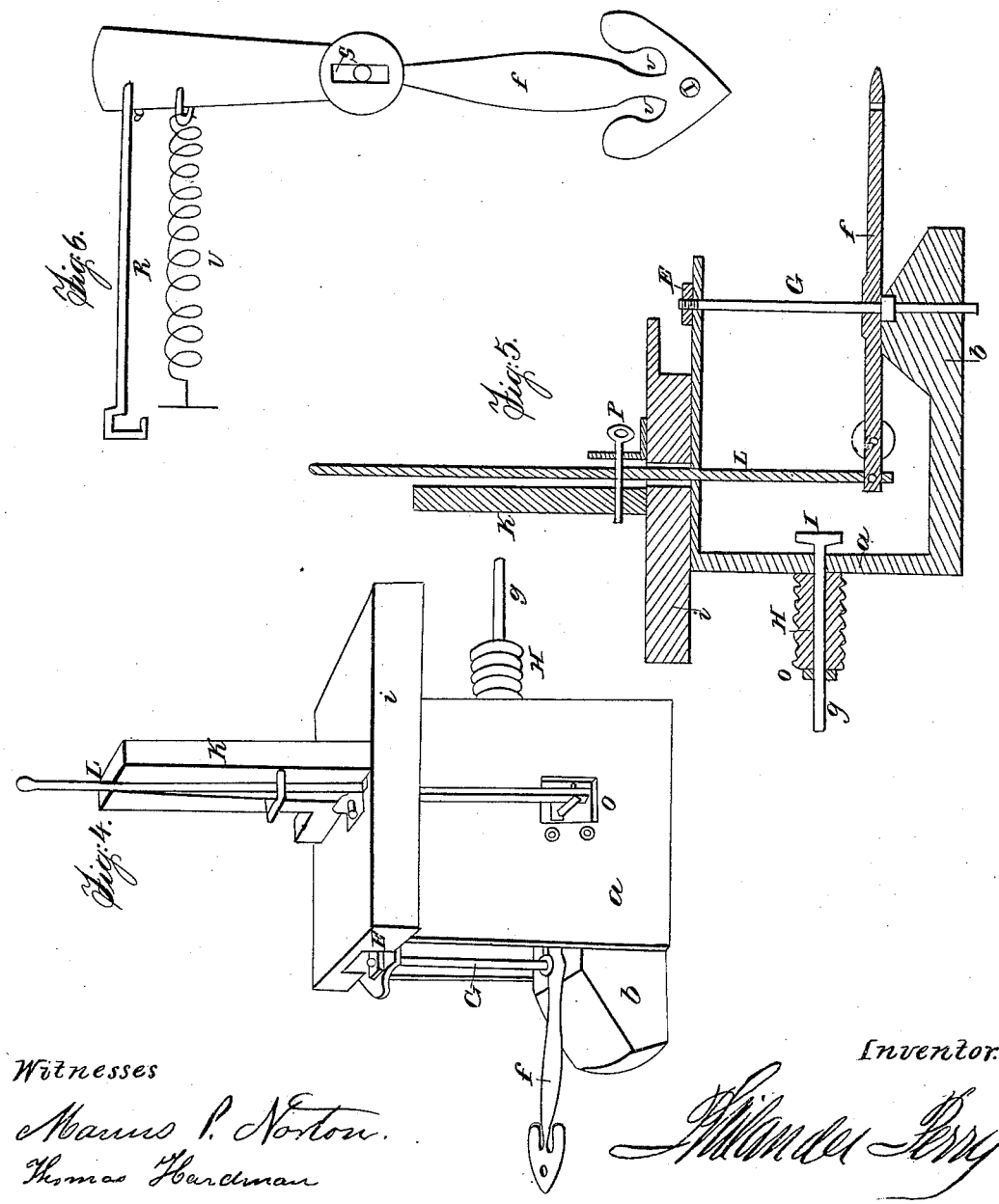

UNITED STATES PATENT OFFICE.

PHILANDER PERRY, OF TROY, NEW YORK.

RAILROAD-CAR COUPLING.

Specification of Letters Patent No. 21,901, dated October 26, 1858.

*To all whom it may concern:*

Be it known that I, PHILANDER PERRY, of Troy, in the county of Rensselaer and State of New York, have invented a new and Improved Combination and Double-Acting Railroad-Car Coupling; and I do hereby declare that the following is a full, clear, and exact description of the same, reference being had to the accompanying drawings, forming a part of this specification, in which—

Figures 1, 2, 3, 4, 5, 6, exhibit the different parts of my improved coupling.

Similar letters of reference in each of the several figures indicate corresponding parts.

The nature of my invention consists in the combination of the horizontally and vertically moving links $f$, $f$, with the parts C, D, E, which adjust said links $f$, $f$, perpendicularly, so as to suit different heights of platforms and with the vertical lever L, and horizontal rod R, for moving the links apart horizontally so as to disconnect the cars, and with the sliding spring boxes which allow the cars to approximate without straining the pins when the cars crowd upon one another.

To enable others, skilled in the art, to make and use my invention, I will proceed to describe its construction and operation.

I construct my car coupling in the following manner, to wit; I make a box as seen at Fig. 1, letter $a$, which may be of any required size, said box has a heavy bumper at the bottom $b$, made in any form or shape desired through which passes the bolt G, as seen at Figs. 1 and 2, which bolt has a fixed collar upon it, D, for the purpose of holding the coupling link $f$, Fig. 1, when adjusted as required by the nut E, on the upper end of said bolt, Fig. 2; said bolt is made long as shown, so that cars of different heights can be coupled together by it. It is also made strong enough to hold the cars in rear of it with their respective loads. $g$, Fig. 1 is the connecting bar between said "coupling box" and the point of bearing upon the trucks.

H, is a steel or rubber spring upon the rod $g$, one end of which is against a pin or nut upon said rod and not shown in Fig. 1, but at Fig. 5, letter $o$, the other end is against the end of the "coupling box" $a$, by means of said springs and the sliding boxes, a sudden jarring and straining of the coupling link pins as the cars come together is in a measure avoided and the motion equalized throughout the entire train.

The "coupling box" $a$, has free action upon the rod $g$, or side ledges of the platform back and forward. The nut I, Fig. 5, holds the coupling at a required place to move the car.

P, Fig. 6, is a pin upon which turns the lever L.

$a$, Fig. 4, is an opening in the side of the "coupling box" $a$, for the purpose of giving free action to the horizontal lever R, Fig. 3.

$f$, Fig. 6, is the "coupling link" and is made in the form and manner as shown in the drawings, it has a slot mortise $s$, Fig. 6.

R, is the horizontal lever connecting the "coupling link" $f$, with the lever L. T, is a hole in the end of the said link for the purpose of coupling with cars having thereon, any other kind of coupling.

V, Fig. 6, is a coiled spring upon the inside of the "coupling box" $a$, for the purpose of equalizing the action of the "coupling link" $f$, while the train is in motion and thereby keep said coupling link in its place and hooked to the pin G. The "coupling link" has free action in all directions, without the danger of uncoupling, Fig. 1, represents a "coupling box" and "link" upon a car and Fig. 4, the same upon another car.

Operation: In order to couple cars with the coupling thereupon said cars together, and the "coupling link" $f$, Figs. 1 and 4 will come against the pins G, G, and pass into the opening as seen at $f$, G, and letter V, on one side or the other of said link and will "hook or couple" when within one inch from bumper by starting forward the train, the bumpers will draw out until stopped by the nut I, Fig. 5, whereupon the car moves forward. To uncouple, the lever L, is operated from the platform I, which is moved as seen at Fig. 3, and thrown around the hook $m$, or $n$, which are for the purpose of holding said "coupling link" either way required, or it may be operated by extending the lever R, far enough to be reached from the outside standing upon the ground, or both.

What I claim as my invention and desire to secure by Letters Patent, is—

The combination of the horizontally and vertically moving links $f$, $f$, with the parts C, D, E, which adjust said links $f, f$, perpendicularly so as to suit different heights of platforms and with the vertical lever L, and horizontal rod R, for moving the links apart horizontally so as to disconnect the cars, and with the sliding spring boxes $a, a$, which allow the cars to approximate without straining the pins when the cars crowd upon one another, substantially as and for the purposes set forth.

PHILANDER PERRY.

Signed in presence of—
 MARCUS P. NORTON,
 THOMAS HARDMAN.